Feb. 11, 1958     H. E. ALTGELT     2,822,739
HITCH DEVICE

Filed Feb. 23, 1951     4 Sheets-Sheet 1

INVENTOR.
HERMAN E. ALTGELT
BY
C. T. Parker & R. C. Johnson
ATTORNEYS

Feb. 11, 1958 H. E. ALTGELT 2,822,739
HITCH DEVICE
Filed Feb. 23, 1951 4 Sheets-Sheet 2
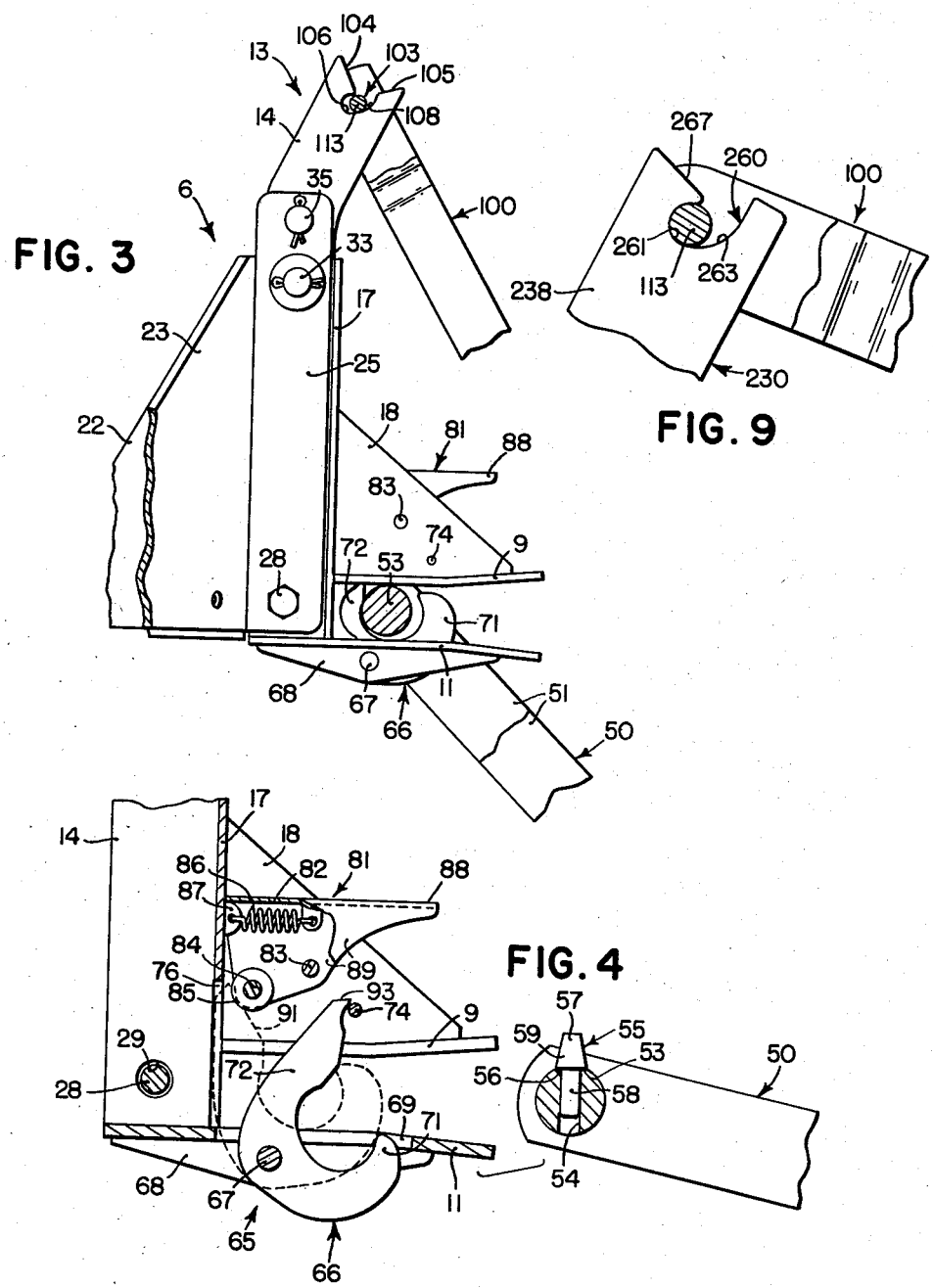
INVENTOR.
HERMAN E. ALTGELT
BY
C. Parker & R C Johnson
ATTORNEYS Feb. 11, 1958　　　H. E. ALTGELT　　　2,822,739
HITCH DEVICE
Filed Feb. 23, 1951　　　　　　　　　　　　　　4 Sheets-Sheet 3

INVENTOR.
HERMAN E. ALTGELT
BY
ATTORNEYS

Feb. 11, 1958　　　H. E. ALTGELT　　　2,822,739
HITCH DEVICE
Filed Feb. 23, 1951　　　　　　　　4 Sheets-Sheet 4

INVENTOR.
HERMAN E. ALTGELT
BY
ATTORNEYS

United States Patent Office 2,822,739
Patented Feb. 11, 1958

2,822,739

HITCH DEVICE

Herman E. Altgelt, Moline, Ill., assignor to Deere & Company, Moline, Ill., a corporation of Illinois Application February 23, 1951, Serial No. 212,368

12 Claims. (Cl. 97—47.14)

The present invention relates generally to agricultural implements and more particularly to implements adapted to be connected with and carried for transport on a farm tractor.

The object and generol nature of the present invention is the provision of a new and improved hitch mechanism especially adapted for easily and quickly connecting an implement of the tractor-carried type to the tractor. More particularly, it is a feature of this invention to provide a hitch device whereby the backing of the tractor into a position for connecting the implement thereto is facilitated, the cooperating parts being so constructed and arranged that the implement may be connected to or detached from the tractor without requiring that the operator leave his seat on the tractor.

These and other objects and advantages of the present invention will be apparent to those skilled in the art after a consideration of the following detailed description, taken in conjunction with the accompanying drawings, in which:

Figure 3 is an enlarged fragmentary side view taken generally along the line 3—3 of Figure 2.

Figure 4 is a sectional view showing the details of the releasable draft hook and associated parts.

Figure 9 is an enlarged fragmentary view showing in detail the shape of the notch in the upper part of the implement-carried draft bracket, with which the rear end of the upper draft link is detachably connected.

Figure 1:
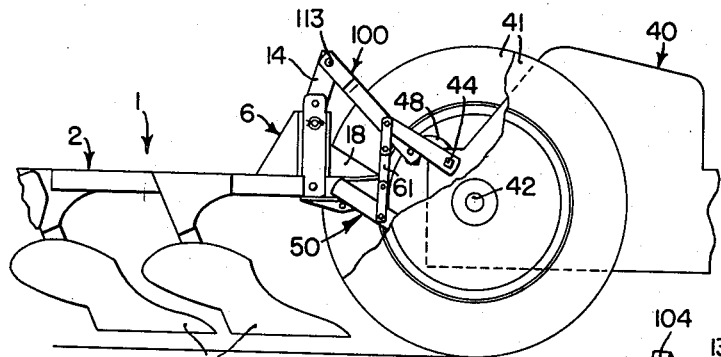
Figure 1 is a side view of a tractor-mounted plow in which the principles of the present invention have been incorporated.

Referring first to Figures 1-4, the present invention has been shown in this form as including a tractor-carried plow 1 having frame means 2, generally of conventional construction, which carries one or more plow bottoms 3. The frame 2 includes beam members 4 and 5 which, at their forward ends, are arranged in forwardly converging relation and are bolted to a draft bracket 6 which, in the preferred form, may be arranged as a permanent part of the plow 1.

Figure 2:
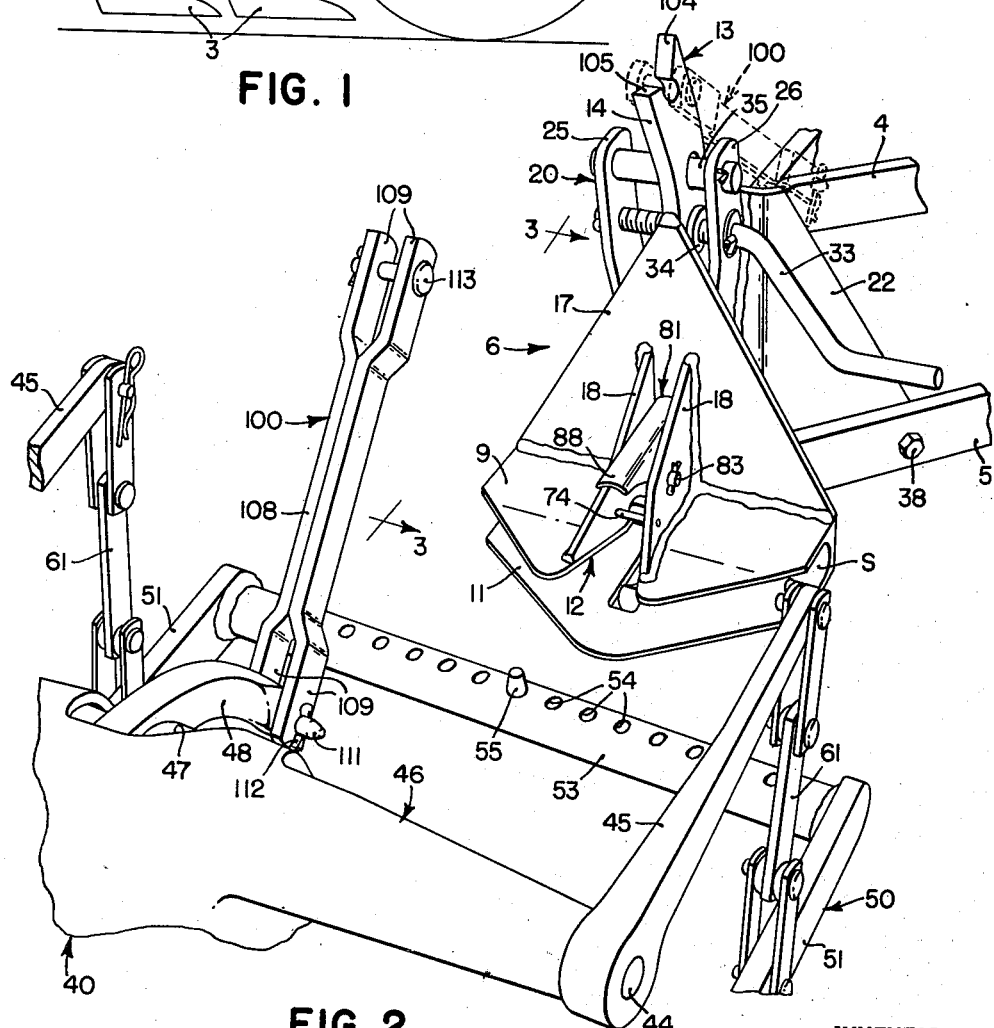
Figure 2 is a fragmentary perspective view showing in particular the draft-transmitting connections and associated parts, arranged in the positions they occupy when the tractor is being backed into a position for connecting the implement to the tractor.

The draft bracket structure 6 includes a pair of vertically spaced, generally horizontally disposed plate sections 9 and 11, each generally triangular in shape and interconnected at their rear portions to form a forwardly facing socket S. The upper hitch plate section 9 is formed with a forwardly diverging or V-shaped notch 12 to which reference will be made below. The draft bracket 6 also includes an upper section 13 which comprises a vertically extending bar 14 connected to the plate sections 9 and 11 by means which includes a transverse vertical triangular plate 17 and a pair of forwardly extending, angular gusset plate sections 18, the latter being spaced apart laterally and disposed on opposite sides of the V-shaped notch 12, as best shown in Figure 2. As best shown in Figure 4, the lower hitch plate section 11 is extended rearwardly so as to lie underneath the lower end of the vertical bar 14, the latter, together with the vertical plate 17 and the hitch plate sections 9 and 11, being securely fixed together, as by welding or the like.

The bracket 6 also includes an implement attached section, indicated in its entirety by the reference numeral 20, and this section of the bracket 6 includes a pair of plate sections 22 and 23 interconnected by a vertical transverse section 24 to which the rear edges of a pair of upwardly extending divergent bars 25 and 26 are welded. The lower portions of the bars 25 and 26 closely approach one another and are apertured to receive a hitch pin 28 which extends through the apertures in the bars 25 and 26 and also through an aperture 29 in the lower portion of the vertically extending draft frame bar 14, as best shown in Figure 4. The opening 29 is slightly larger than the hitch pin 28 so that some lateral movement of the forward section of the draft bracket structure 6 relative to the rear draft bracket structure 20 is accommodated, this being for the purpose of leveling the plow 1 laterally. Such leveling is accomplished by means of a crank screw 33 supported in the upper portions of the divergent bars 25 and 26 and a traveling nut 34 carried in the upper portion of the vertical draft bracket bar 14, as best shown in Figure 2. No claim is made in the present application to the particular details of this leveling mechanism. The upper ends of the bars 25 and 26 are rigidly interconnected by a transverse bolt or pin 35, the bar 14 being apertured to loosely receive the pin 35. The forward ends of the frame bars or beams 4 and 5 are bolted, as at 38, to the lower portions of the plate sections 22 and 23, as indicated at 38 in Figures 2 and 6.

The present invention is shown in Figures 1-4 as adapted to be attached to a tractor 40 of the type which includes a pair of rear traction wheels 41 carried on axle shafts 42 that are journaled in an axle housing at the rear of the tractor. The latter also includes a power lift structure which comprises a transverse rockshaft 44 on the ends of which lift arms 45 are fixed. Centrally, the housing 46 which encloses the rockshaft 44 and other portions of the power lift unit is apertured, as at 47, to provide for a generally rearwardly extending adjusting arm 48 which at its forward portion is fixed to the central part of the rockshaft 44. The rear end of the adjusting arm 48 is apertured.

The tractor 40 includes a rearwardly extending, generally vertically swingable drawbar 50 the side arms 51 of which, according to the present invention, are provided at their rear ends with a rigidly interconnected transverse draft-transmitting bar 53 (Figure 2), the latter being provided with a plurality of vertical, laterally spaced apart through openings 54 in any one of which a guide pin 55 may be disposed. As best shown in Figure 4, each of the openings 54 is enlarged, as by a counterbore 56, at its upper end, which cooperates with a shoulder 59 on the upper head portion 57 of the pin 55. The head 57 is slightly tapered and the pin 55 has a shank 58 which fits in any one of the holes 54 with sufficient looseness to accommodate inserting and removing the pin by hand.

The pin 55 cooperates with the V-shaped notch 12 in the upper hitch plate section 9 so as to guide the bar 53 into the proper position between the hitch plates 9 and 11 so that when the bar 53 is seated in the socket S the implement occupies the desired position laterally relative to the drawbar 50 of the tractor. Disposing the pin 55 in different openings provides for adjusting the position of the implement, to which the draft bracket 6 is attached, laterally relative to the tractor. The drawbar 50 is raised and lowered by a lost-motion connection, preferably in the form of pivotally interconnected links 61, with the rear ends of the lift arms 45.

The crossbar 53 of the tractor drawbar is adapted to be locked in the socket S of the draft bracket structure 6 by means of an automatic coupling that is indicated in its entirety by the reference numeral 65. The coupling 65 includes a draft hook member 66 which is pivotally mounted by a pin 67 or the like on the lower side of the lower hitch plate section 11, the pin being received in a pair of depending bars 68 fixed, as by welding, to the lower face of the hitch plate section 11, the latter being slotted, as at 69, to accommodate the member 66. The latter member includes a bar-engaging hook section 71 and a rear abutment section 72, the parts being constructed so that normally the draft hook member 66 occupies the position shown in full lines in Figure 4 when the implement is disconnected from the tractor. In this position the hook section 71 lies in the slot 69 entirely out of the socket S or the space between the upper and lower hitch plate sections 9 and 11, and the abutment section 72 at its upper end contacts a stud 74 carried by the gusset plates 18.

When the implement is to be hitched to the tractor, the latter is backed with the drawbar 50 raised or lowered so as to dispose the bar 53 in a position to enter between the plates 9 and 11. As the bar passes into the socket S between the plates 9 and 11, the guide pin 55 contacts one side or the other of the V-shaped notch 12 and, in the event of misalignment, the rearward movement of the tractor acts through the guide pin 55 to shift the implement laterally in one direction or the other. The rearward movement of the bar 53 relative to the implement causes the bar 53 to engage the abutment section 72 and force the same rearwardly, substantially into its dotted-line position (Figure 4), which brings the forward hook section 71 into a position in front of the bar 53 and substantially in front of the guide pin 55, whereby the presence of the latter does not interfere with the hitch connection between the bar 53 and the hook section 71. A slot 76 is formed in the lower portion of the transverse plate 17 to receive the abutment section 72.

The draft hook member 66 is locked in its drawbar-engaging position (dotted lines, Figure 4) by means of a detent 81 which comprises a lever member 82 pivotally mounted on a pin 83 carried by the gussets 18, the lever 82 having laterally spaced apart depending flanges 89 carrying a stud 84 on which an abutment-engaging roller 85 is journaled. A spring 86 is connected at one end to one of the depending flanges 89 and at the other end to a lug 87 formed on or carried by the plate 17. The lever 82 includes a forwardly extending handle section 88 which extends outwardly from the spaced apart gussets. The forwardly facing surface 91 of the abutment section 72, which surface is adapted to be engaged by the roller 85, is shaped so that when the draft hook member 66 is locked in its drawbar-locking position a line normal to said surface 91 passes substantially through the pivot 83 of the lever 82. Thus, the draft forces transmitted have no effect so far as displacing or rocking the detent lever 82 is concerned, yet the draft hook member 66 may readily be disconnected from the tractor drawbar by pushing downwardly on the forward end 88 of the lever 82. The forward edge at the upper portion of the abutment section 72 is beveled, as at 93, so that when the transverse bar 53 is moved rearwardly into the socket S, the rearward movement of the upper end of the abutment section 72 can engage the roller 85 and displace the roller 85 upwardly until the detent 81 can move downwardly into its locking position.

According to the principles of the present invention, an adjusting link 100 is adapted to be connected between the rockshaft adjusting arm 48 and the upper end of the upwardly extending draft bracket bar 14. To this end, the upper end of the bar 14 is of special form. As best shown in Figures 2 and 3, the upper end of the bar 14 is formed with an upwardly opening notch 103 having upwardly diverging walls 104 and 105, and the lower portion of the notch 103 is extended in a rearward direction, forming a socket 106. The adjusting link 100 is formed of a pair of strap members 108, each offset laterally outwardly at each end, as at 109, and apertured to provide for the reception of the connecting pin at each end of the link 100. The normally front end of the link 100 carries a quick detachable pin 111 held in place by a hairpin connector 112, and the offset sections 109 of the link 100 at the other end thereof carry a pin 113 which normally remains as a permanent part of the link 100. The front end of the link 100 is adapted to be connected to the tractor through the depth-adjusting arm 48, this connection being established by removing the pin 111, applying the front end of the link 100 to the rear end of the adjusting arm 48, and then re-inserting the pin 111 through the openings in the offset front ends 109 and through the opening in the arm 48, and then inserting the hairpin connector 112. This pivotally connects the front end of the link 100 with the tractor. Then, assuming that the tractor and implement are on substantially level ground, as soon as the tractor is backed into position, carrying the bar 53 into the socket S and the implement being guided laterally into the desired position by the guide pin 55 acting in conjunction with the V-shaped notch 12 in the upper hitch plate section 9, the draft hook 66 automatically latches the bar 53 in the socket S and the upper notched portion 103 of the bar 14 is in a position so that when the link 100 is swung manually generally downwardly the pin 113 is in a position to pass in between the upwardly diverging surfaces 104 and 105 and directly into the socket 103. If there is some slight misalignment at this point, operating the power lift rockshaft 44 in one direction or the other will cause a slight, generally fore-and-aft shifting of the link 100 so that the pin 113, riding on one or the other of the angled surfaces 104 and 105, can be made to drop into the bottom of the notch 103. If the implement at this moment is in a position to start working, the tractor operator operates the tractor power lift rockshaft 44 in a direction to permit the drawbar 50 to lower. Soil pressure against the points of the plow bottoms then forces the outer end of the adjusting arm 48 downwardly and forwardly, thus providing for quick penetration as soon as the tractor is driven forwardly. During this movement of the adjusting arm 48, the chain links 61 are slack, with the result that the depth of operation is controlled during this range of movement of the power lift rockshaft 44 by the position of the adjusting arm 48. Since the plow bottoms 3 are well below the point of connection, at the bar 53, between the plow frame and the drawbar 50 of the tractor, the reaction of the soil pressure against the plow bottoms 3 causes the upper end of the bar 14 to be forced forwardly, but this movement is resisted by the link 100 acting in compression, and during this action, the pin 113 seats snugly and securely within the rearwardly extended portion 106 of the notch 103.

When it is desired to raise the implement into a transport position, the power lift rockshaft 44 is operated in a clockwise direction, as viewed in Figure 1, first exerting a rearward thrust through the link 100 against the bar 14, thus raising the points of the plow bottoms and tending to cause them to run rapidly out of the ground.

Continued upward swinging of the lift arms 45, resulting from the aforesaid clockwise rocking of the shaft 44, acts to raise the drawbar 50 and through upward movement of the latter the front end of the implement, particularly the draft structure 6, is also raised bodily. Since the upper end of the bar 14 is connected to the tractor through the link 100, the latter now acts in tension to cause the upward movement of the front end of the implement to also raise the rear end of the implement, the latter being raised more or less in a level position. During the time the link 100 acts in tension, the pin 113 lies against the forward edge 108 of the notch 103. When it is desired to disconnect the implement from the tractor, all that it is necessary to do is, first, lower the implement until it rests on the ground, then manually swing the link 100 forwardly and upwardly to carry the rear end out of the notch 103, and lastly press down on the forward end 88 of the detent 81, which releases the latch member 66 from the tractor drawbar 50. The tractor may then be driven away from the implement without ever requiring that the operator dismount from the tractor to effect the disconnection of the implement therefrom.

Figure 5:
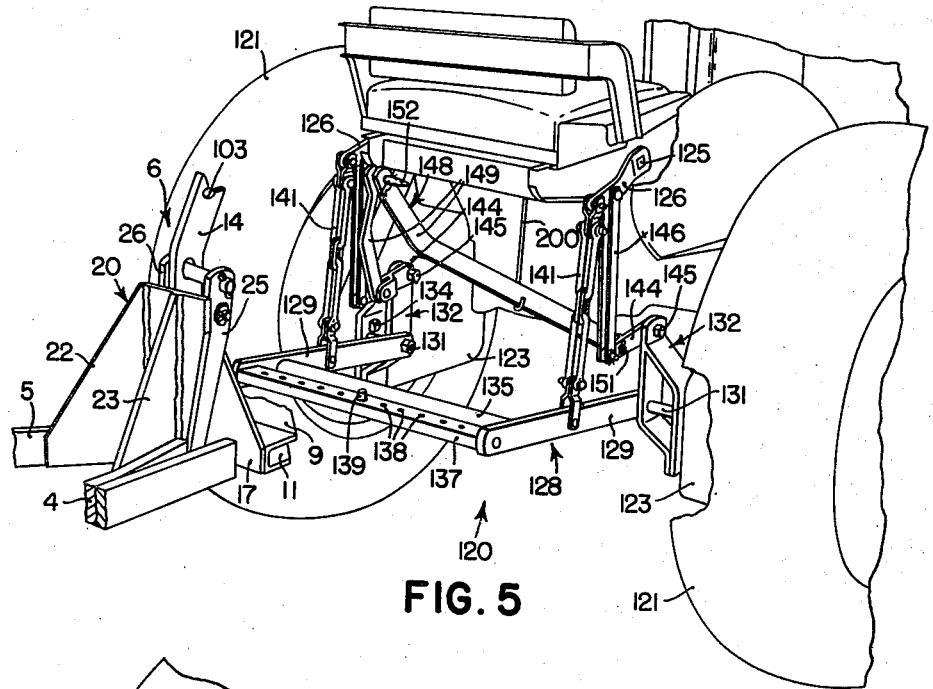
Figures 5 and 6 are perspective views, showing respectively, modified forms of drawbar constructions attachable to various kinds of tractors.

In some cases farm tractors do not have as a part of their regular equipment a lower, vertically swingable drawbar and an upper adjusting arm, such as the drawbar 50 and arm 48 of the tractor 40. A tractor of this type is illustrated in Figure 5 and in order to connect an implement having the above described draft bracket structure to such a tractor additional attaching mechanism, constructed according to the principles of the present invention, is provided. Referring now to Figure 5, the auxiliary drawbar and attaching structure is indicated in its entirety by the reference numeral 120 and the tractor, with which this form of the invention is adapted to be connected, comprises rear traction wheels 121 carried on axle shafts supported for rotation in drop housing sections 123, and the tractor motor is connected to operate a hydraulic power lift system which includes a transverse rockshaft 125 to which a pair of lift arms 126 are fixedly connected, as to the ends of the rockshaft 125. The outer ends of the lift arms 126 carry pairs of openings for connecting implements and other parts thereto. The auxiliary drawbar and attaching mechanism 120 includes a drawbar 128 having side members 129 pivotally connected at their forward ends to pivots 131 carried by brackets 132 there being a bracket 132 fixed to the inside face of each of the drop housings, by any suitable means, as by one or more bolts 134. The two side members 129 of the drawbar 128 are rigidly interconnected by a cross member 135, the ends of which are securely fixed, as by welding, to the rear end portions of the side bars 129. The rear ends of the bars 129 are apertured to receive a transversely disposed bar 137 rockably therein, the bar 137 having a plurality of apertures 138 formed like the apertures 54 described above, and in any one of the apertures 138 a guide pin 139, substantially of the same construction as the guide pin 55 described above, is or may be disposed. Lost-motion means, preferably in the form of chains 141, connect the side arms to the outermost ends of the lift arms 126, whereby rocking movement of the power lift rockshaft 125 serves to raise and lower the drawbar 128. A pair of auxiliary arms 144 are pivotally connected, at 145, to the upper portions of the brackets 132, and the outer or rear ends of the auxiliary arms 144 are connected by links 146 with the end portions of the lift arms 126, just forwardly of the points of connection of the chains 141 thereto. In this form of the invention an adjusting link 148, comprising forwardly diverging bars 149, is connected with the auxiliary arms 144 by pivot pins 151 carried by the arms 144 just forward of the pivot connections at the lower ends of the links 146. The rear converging ends of the bars 149 are apertured to carry a pin 152 which is adapted to enter the upper notch 103 in the bar 14 of the draft structure 6 when the crossbar 137 of the drawbar 128 is latched or locked in place between the hitch plate sections 9 and 11. In this form of the invention the drawbar 128 and the adjusting link 148 are connected and disconnected in substantially the same manner as that described above in connection with the drawbar 50 and the adjusting link 100. Figure 5 shows the drawbar 128 held, by virtue of its connections with the power lift rockshaft 125, in a position to enter the socket between the hitch plates 9 and 11 when the tractor is backed, the adjusting link 148 being shown substantially in the position it occupies when the pin 152 is seated in the notch 103. If desired, the adjusting link 148 may be held manually in about the position shown in Figure 5 while the tractor is being backed into position, or, if desired, a hook 200 may be provided for this purpose. As soon as the drawbar 128 is latched in place, the adjusting link 148 may be released and the pin 152 will enter the notch 103.

Figure 6:
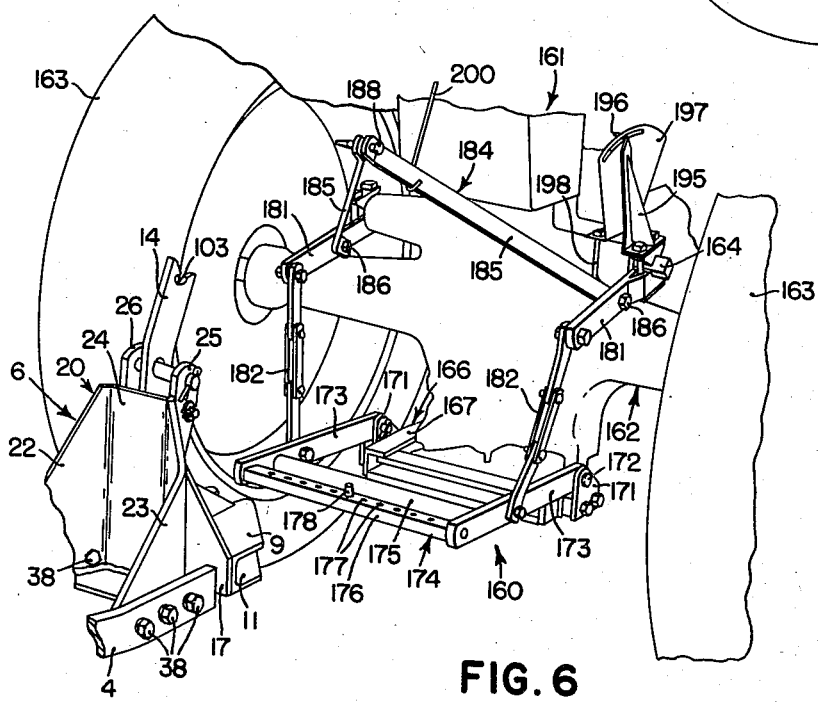

Figure 6 shows a slightly different form of auxiliary drawbar and attaching mechanism which, in Figure 6, is indicated in its entirety by the reference numeral 160. In this form, the tractor, which is indicated at 161, includes a rear axle structure 162 carrying axle shafts upon which rear traction wheels 163 are mounted. The tractor 161 includes a power lift structure that comprises a transversely disposed power lift rockshaft 164, and the lower portion of the rear axle 162 of the tractor 161 is provided with a drawbar support 166 which includes a pair of laterally spaced apart angle members 167. According to the present invention, a pair of brackets 171 are attached to the drawbar support angles 167 and carry pivots 172 rockably receiving the side members 173 of a rearwardly extending, vertically swingable drawbar 174. The latter member is substantially like the drawbar 128 described above, including a rigidly interconnected crossbar 175 and a pivoted crossbar 176, the latter having a plurality of openings 177 in any one of which a guide pin 178 is or may be disposed. A lift arm 181 is adapted to be secured to each end of the tractor rockshaft 164 and the rear end of each of the arms 181 is apertured to receive the upper end of a lost-motion chain connection 182 that extends between each arm and the associated side arm 173 of the drawbar 174. An adjusting link 184, comprising forwardly diverging bars 185, is connected by pivots 186 to the lift arms 181 at points intermediate the connections of the lift chains 182 and the connections between the arms 181 and the rockshaft 164. The rear converging ends of the bars 185 are apertured to receive a pin 188 which is adapted to enter a notch 103 at the upper end of the bar 14 of the implement draft structure 6.

In order to provide the operator with some means for determining the position of the drawbar 174, which may not be too easily seen from the seat of the tractor 161, I provide an arm 195 and fix the same to the rockshaft 164 at one end thereof by the same means that fastens the associated power lift arm 181 to the rockshaft. The arm 195 serves as an indicator and has its outer end 196 movable over a panel 197 which is fixed, as by a U-bolt 198, to the adjacent portion of the power lift housing in which the rockshaft 164 is journaled. By observing the position of the outer end 196 of the arm 195 relative to the panel 197, the operator can determine the position of the drawbar 174, and of course this same means also may be used as an indicator for the position of the power lift arms 181, particularly with reference to the adjusting link 184.

If desired, the hook means 200 may be provided for holding the upper link member 184, as shown in Figure 6, up in a position so that it will not conflict or interfere with service of the tractor when detached from the implement. The hook 200 in most cases preferably is so formed as to hold the associated adjusting link up in a position such that the rear connecting pin will pass above the upper end of the draft bracket bar 14. Thus, the operator need not manually hold the adjusting link up in a position to clear the bar 14 when backing the tractor, and then after the drawbar has been hitched to the draft bracket, the hook 200 may be detached from the link and the latter dropped into the notch 103.

Figure 7:
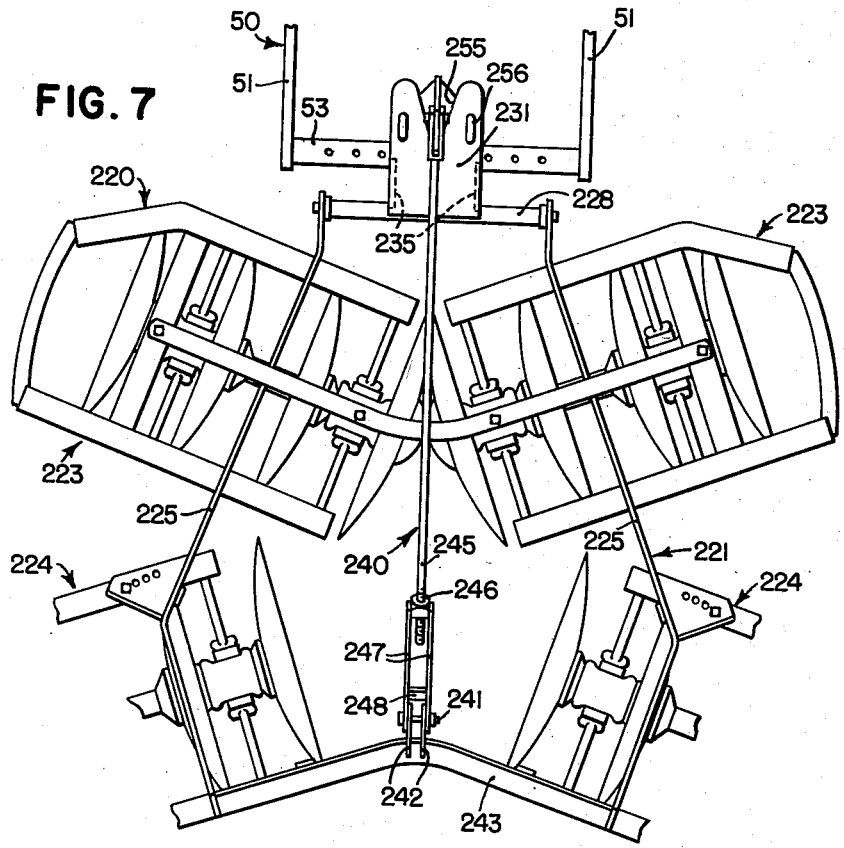
Figure 7 is a further modified form of the present invention showing the application of the principles thereto to a disk harrow of the pick-up or tractor-carried type.
Figure 8:
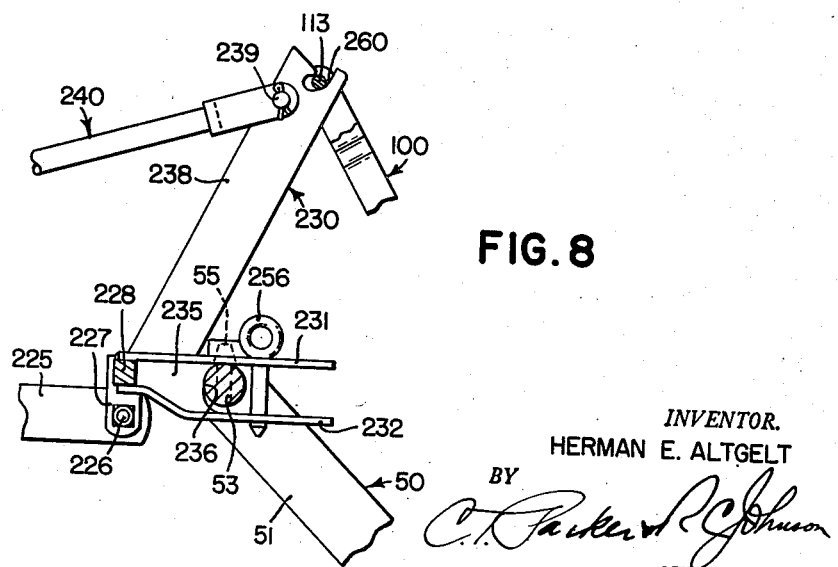
Figure 8 is an enlarged fragmentary sectional view of the hitch parts in the positions they occupy when the implement of Figure 7 is raised into a transport position.

A somewhat different form of the present invention is shown in Figures 7–9, and referring now to these figures it will be noted that the implement in which the principles have been incorporated is in the form of a tandem disk harrow, indicated in its entirety by the reference numeral 220, having a main frame 221 to which pairs of front and rear gangs 223 and 224 are fixed. The forward ends of the bars 225, which constitute the principal fore-and-aft extending members of the frame 221, are pivotally connected, as by bolts 226, to depending lugs 227 fixed to the laterally outer ends of a front cross member 228. A draft bracket, indicated in its entirety by the reference numeral 230, includes upper and lower plate sections 231 and 232, the rear ends of which are welded to the bar 228, making the latter member a part of the draft bracket structure 230. The upper and lower hitch plate members 231 and 232 are connected together, adjacent their rear ends, by interconnecting vertical bar sections 235, the forward edges 236 of which are rounded, as best shown in Figure 8, so as to serve as stops limiting the rearward movement of the crossbar 53 (see Figure 2) of the tractor drawbar 50, it being noted that the implement 220 is thus particularly adapted to be connected to a tractor of the type shown at 40 in Figures 1 and 2, although the hitch plate sections 231 and 232 may receive either of the drawbars 128 and 174 shown in the drawings and described above, if desired. In the form of the invention shown in Figures 7–9, the draft bracket structure 230 includes an upwardly and forwardly extending strut 238, and the upper portion of the latter is apertured to receive a pivot pin 239 by which the forward end of an adjustable thrust bar structure 240 is connected thereto. The rear end of the adjustable thrust bar structure 240 is pivotally connected, as at 241, to a bracket 242 that is fixed to the central portion of a rear angle member 243 which forms a rear portion of the frame 221. The forward member 245 of the adjustable thrust member 240 is in the nature of a rod, threaded at its rear end and received in a nut section 246 that is welded to a pair of strap members 247, the latter being apertured at their rear ends to receive the pivot connector 241. The rear end portions of the strap members are rigidly interconnected by a cross piece 248.

The upper hitch plate section 231 is provided with a forwardly facing V-shaped notch 255 and is therefore substantially like the upper hitch plate section 9 described above in connection with the form of the invention shown in Figure 2. As best shown in Figure 8, the guide pin 55 cooperates with the V-shaped notch 255 when backing the tractor into connection with the draft structure 230. In this form of the invention, instead of an automatically engageable latch, I provide a pair of laterally spaced apart openings in the upper hitch section 231 adjacent the apex of the notch 255, and in these openings, and in aligned openings formed in the lower hitch plate section 232, I place a pair of hitch pins 256. The openings receiving the hitch pins 256 are so spaced, relative to the curved stops 236, that there is an appreciable amount of fore-and-aft clearance between the stops 236 and the pins 256, and therefore since the latter are fairly closely adjacent the rear end of the notch 255, the hitch and implement swing laterally generally about the axis of the associated guide pin 55. Also, the vertical spacing between the plates 231 and 232 is such that there is vertical clearance between the plates and the associated bar 53. As a result of this construction, the implement 220 may have an appreciable amount of lateral swinging, and also lateral tilting about a generally fore-and-aft extending axis, relative to the tractor drawbar.

The upper end of the vertical draft member 238 is formed with a notch 260 which is substantially the same as the notch 103 described above. It will be noted, particularly from Figure 9, that the notch 260 is shaped so as to have a forwardly extended section 261 against which the pin 113 of the upper adjusting link member 100 is adapted to bear when the implement 220 is in operating position and soil pressure against the disks acts to force the upper end of the vertical draft member 238 against the pin 113. The notch 260 is so formed that, in operating position, the rearwardly extended notch portion 261 bears against the pin 113 through substantially 180°.

When the implement 220 is raised into its transport position, the upper link 100 and lower drawbar 50 takes substantially the positions shown in Figure 8. From this figure it will be noted that the notch 260 is so shaped that the forward surface 263 of the notch 260, against which the pin 113 bears when the implement is in a transport position, is disposed adjacent the rear surface 261, the relationship between these two surfaces being such that although the pin 113 moves from the notch section 261 over against the notch section 263, the rear end of the implement is held in substantially its maximum raised position, yet there is sufficient width at the throat of the notch 260 to accommodate the ready passage of the pin 113 into the notch 260. In this form of the invention the upper end of the vertical draft bracket member 238 has an angled surface 267 leading from the rear edge of the member 238 downwardly and forwardly toward the notch 260, the forward and upper corner at the upper end of the member 238 being extended above the surface 267 so that, when hitching the implement to the tractor and in swinging the link 100 over into a position to engage the upper end of the member 238 and enter the notch 236, the pin 113 normally encounters the angled surface or edge 267, whereby, by operating the power lift a small amount to raise the drawbar 50, the pin 113 will be caused to enter the notch 260 and rest against either the notch section 261 or the notch section 263, according to whether the implement is put into operating position or raised into its maximum transport position. It will be observed that the notch 103 is of substantially the same form as just described in connection with Figures 8 and 9 and that the notch 103 has the same advantage in cooperating with the associated adjusting links 100, 148 or 184, to prevent the rear end of the implement from dropping down when the implement is raised into its transport position.

While I have shown and described above the preferred structure in which the principles of the present invention have been incorporated, it is to be understood that my invention is not to be limited to the particular means shown and described above, but that, in fact, widely different means may be employed in the broader aspects of my invention.

What I claim, therefore, and desire to secure by Letters Patent is:

1. A hitch device for connecting an implement to a tractor in draft-transmitting relation, said tractor having a generally vertically swingable drawbar pivotally connected with the rear portion of the tractor and including a transverse implement-receiving bar, and a generally vertically swingable link pivotally connected at its front end with the rear portion of the tractor above said drawbar, the rear end of said link carrying a pin disposed transversely of said link and positioned generally horizontally, said hitch device comprising a bracket adapted to be connected to the front portion of the implement and having vertically spaced, forwardly extending hitch plate sections, the vertical spacing thereof serving to accommodate the reception of the transverse bar of said tractor drawbar therebetween when the tractor is backed, relative to the implement, to move said bar into position between said hitch plate sections, means for releasably holding said bar in position between said hitch plate sections, and means on the upper portion of said bracket forming an upwardly facing, generally V-shaped notch positioned in a generally vertical fore-and-aft extending plane, the upwardly facing edges of said notch converging downwardly so that, when the drawbar is engaged with said bracket and the upper link is in a position disposing the transverse pin at the rear end of said link in contact with one or the other of said upwardly facing edges, movement of the tractor drawbar in one direction or another will shift the upper end of said bracket so that gravity will cause said pin to drop in said notch.

2. In a hitch device for connecting an implement to a tractor having a lower, generally vertically swingable drawbar and an upper, generally horizontal, vertically swingable link carrying a hitch pin at its rear end, the improvement comprising a generally vertical draft structure at the front portion of said implement, said structure including at its lower portion means for detachably receiving the rear portion of said tractor drawbar unit and means at the upper portion of said structure forming an upwardly facing notch adapted to receive the pin at the rear end of said upper link, said notch having a rearward section receiving said pin when said upper link is stressed in compression, and a portion adjacent said rearward section and disposed forwardly thereof in a position to accommodate movement of said pin from the forward portions of said notch to said rearward portion, said forward portion of the notch extending at a forward and upward angle, whereby when the implement is raised into a transport position and the upper link extends downwardly and forwardly from the upper portion of said bracket, said pin at the rear end of said upper link lies in a position closely adjacent the rearwardly extended portion of said notch.

3. A hitch device for connecting an implement to a tractor in draft-transmitting relation, said device comprising a transversely disposed bar having a generally vertically disposed guide abutment fixed to the bar, a bracket adapted to be carried on the implement and including upper and lower hitch plate sections disposed in vertically spaced relation so as to receive said bar therebetween and a rear portion interconnecting said upper and lower sections, one of said plate sections having a generally V-shaped notch, the walls of which are adapted to engage said abutment for guiding the bar into position between said hitch plate sections, and latch means carried by said bracket adjacent the apex of said V-shaped notch and engageable with said bar, after the latter is guided into position between said plate sections, for locking the bracket and bar together, said latch means being located forwardly of said rear bracket portion a distance sufficient to provide for pivotal movement in a generally horizontal plane of said transverse bar about said latch means as a fulcrum, when said latch means engages said transversely disposed bar.

4. A hitch device for connecting an implement to a tractor in draft-transmitting relation, said device comprising a transversely disposed bar having a generally vertically extending guide abutment fixed to the bar, a bracket adapted to be carried on the implement and including upper and lower hitch plate sections disposed in vertically spaced relation so as to receive said bar therebetween and a rear portion interconnecting said upper and lower sections, one of said plate sections having a generally V-shaped notch, the walls of which are adapted to engage said abutment for guiding the bar into position between said hitch plate sections, and latch means carried by said bracket and engageable with said bar for locking the bracket and bar together, said latch means including means engageable with the forward sides of said transversely disposed bar, there being sufficient clearance in a fore-and-aft direction between said bar engaging means and said bar, when the bar is disposed adjacent said rear bracket portion, to provide for pivotal movement of said transverse bar in a generally horizontal plane about said latch means as a fulcrum relative to the implement.

5. In combination, a tractor having a generally vertically swingable drawbar pivotally connected with the rear portion of the tractor and including a transverse implement-receiving bar, a generally vertically swingable link pivotally connected at its front end with the rear portion of the tractor above said drawbar, the rear end of said link carrying connecting means disposed transversely of said link and positioned generally horizontally, a bracket connected to the lower front portion of the implement and having vertically spaced, forwardly extending hitch plate sections, the vertical spacing thereof serving to accommodate the reception of the transverse bar of said tractor drawbar therebetween when the tractor is backed, relative to the implement to move said bar into position between said hitch plate sections, means releasably holding said bar in position between said hitch plate sections, and means on the upper portion of said bracket forming a generally upwardly facing surface and a notch into which said surface leads, the upwardly facing surface being adapted to receive said transverse connecting means although the latter is not in a position to enter said notch, movement of the tractor drawbar in one direction or another serving to shift the upper end of said bracket so in a generally fore-and-aft direction whereby said surface serves to guide said transverse connecting means into said notch.

6. In an agricultural implement, the combination of a farm tractor having a power operated generally vertically swingable drawbar, an agricultural implement having frame means, a generally vertical hitch structure at the front portion of said frame means, a drawbar-receiving latch means carried at the lower part of said hitch structure and open forwardly so as to receive and engage the tractor drawbar when the tractor is backed into the implement, an upper link extending in a generally fore-and-aft direction and connected at its forward portion with the tractor above said drawbar for generally vertical swinging, upwardly facing socket means on the upper portion of said hitch structure disposed appreciably above said drawbar receiving latch means, whereby vertical movement of the tractor drawbar, after being engaged with said latch means, will impart a component of movement in a fore-and-aft direction to said upwardly facing socket means, and means on the rear end of said upper link adapted to seat in said socket means after operation of said tractor drawbar acts to shift the upper portion of said hitch structure in a generally fore-and-aft direction relative to the tractor and said upper link.

7. The invention set forth in claim 1, further characterized by means connecting the front end of the vertically swingable link with the tractor, comprising a link-shifting arm, lost-motion means connecting said arm and the tractor drawbar, and means pivotally connecting the front end of said link with said arm.

8. The invention set forth in claim 7, further characterized by said tractor including a power-actuated means connected to actuate said link-shifting arm.

9. The invention set forth in claim 1, further characterized by means pivotally connecting the vertically swingable drawbar with the tractor, comprising a pair of brackets attachable to the lower portion of the tractor and pivotally receiving said drawbar.

10. The invention set forth in claim 1, further characterized by said drawbar including a rearwardly disposed transverse bar having a plurality of pin-receiving openings, a guide pin removably disposed in any one of said openings, and means on certain of said hitch plate sections to receive said guide pin.

11. The invention set forth in claim 1, further characterized by said drawbar including a rearwardly disposed transverse bar having a plurality of pin-receiving openings, a guide pin removably disposed in any one of said openings, and one of said plate sections having a generally V-shaped notch, the walls of which are adapted to engage said removable pin for guiding the transverse bar into position between said hitch plate sections when the tractor is backed toward said implement.

12. The invention set forth in claim 1, further characterized by said tractor having a power operated rockshaft provided with lift arms fixed to the end portions thereof, means connecting said lift arms with said drawbar, means pivotally connecting the vertically swingable drawbar with the tractor, comprising, a pair of brackets attachable to the lower portion of the tractor below said lift arms and pivotally receiving said drawbar, a pair of rearwardly extending arms pivotally connected at their forward ends to the upper portions of said brackets, said vertically swingable link comprising forwardly extending, laterally spaced apart portions connected at their forward ends with the rear end portions of said rearwardly extending arms and converging rearwardly to form means receiving said transversely disposed pin, and means connected between said lift arms and said rearwardly extending arms for swinging said rearwardly extending arms generally vertically when said rockshaft is actuated.

References Cited in the file of this patent

UNITED STATES PATENTS

| | | |
|---|---|---|
| 677,332 | Bartholomew | July 2, 1901 |
| 1,815,470 | Gaiser | July 21, 1931 |
| 2,050,518 | Baumgardner | Aug. 11, 1936 |
| 2,269,806 | Brecka | Jan. 13, 1942 |
| 2,320,141 | Kott | May 25, 1943 |
| 2,322,342 | Bunn | June 22, 1943 |
| 2,352,491 | Orelind | June 27, 1944 |
| 2,423,148 | Johnson | July 1, 1947 |
| 2,429,761 | Ketel | Oct. 28, 1947 |
| 2,505,609 | Ego | Apr. 25, 1950 |
| 2,547,313 | Gosser | Apr. 3, 1951 |
| 2,567,736 | Silver et al. | Sept. 11, 1951 |
| 2,579,086 | Oehler | Dec. 18, 1951 |
| 2,584,217 | Morkoski | Feb. 2, 1952 |

FOREIGN PATENTS

| | | |
|---|---|---|
| 587,725 | Great Britain | May 5, 1947 |
| 462,491 | Canada | Jan. 17, 1950 |
| 266,566 | Switzerland | May 1, 1950 |